United States Patent [19]

Kinno et al.

[11] 4,353,730

[45] Oct. 12, 1982

[54] GRANULATING PROCESS

[75] Inventors: Bunji Kinno, Chiba; Hiroshi Hirayama; Tetsuzo Honda, both of Funabashi, all of Japan

[73] Assignees: Toyo Engineering Corporation; Mitsui Toatsu Chemicals, Incorporated, both of Japan

[21] Appl. No.: 207,646

[22] Filed: Nov. 17, 1980

[30] Foreign Application Priority Data

Nov. 29, 1979 [JP] Japan .................................. 54/153681

[51] Int. Cl.$^3$ ........................ C05B 15/00; B21B 15/02
[52] U.S. Cl. ...................................... 71/29; 71/64.06;
71/64.07; 23/301; 23/313 FB; 209/139 R;
427/213; 264/7
[58] Field of Search ........................ 71/64.6, 64.7, 29;
427/213

[56] References Cited

U.S. PATENT DOCUMENTS

3,231,413  1/1966  Berquin ............................... 427/213
4,219,589  8/1980  Niks ..................................... 427/213

*Primary Examiner*—Sam Silverberg
*Attorney, Agent, or Firm*—McGlew and Tuttle

[57] ABSTRACT

Disclosed is a granulating process which comprises the steps of providing a plurality of spouted bed granulation zones arranged in series and one or more fluidizing zones for cooling and drying purposes each disposed between two adjacent ones of the granulation zones, introducing priming granules of a particulate material into the first-stage granulation zone while spraying thereinto an adherent and solidifiable liquid together with a gas stream to enlarge the priming granules, cooling and drying the enlarged granules in the succeeding fluidizing zone, passing the resulting granules through the other granulation zones and fluidizing zones successively, and withdrawing the granules enlarged to a desired particle size from the last-stage granulation zone. Also disclosed is an apparatus for carrying out this granulating process.

19 Claims, 10 Drawing Figures

GRANULATING PROCESS

BACKGROUND OF THE INVENTION (1) Field of the Invention

This invention generally relates to the treatment of particles and, in particular, to a process for the coating or enlargement of particles and an apparatus useful therefor. More particularly, it relates to a granulating process in which priming granules of a particulate material are coated or enlarged by spraying, together with a gas stream, a like or different material in the form of a liquid that is adherent and solidifiable by cooling or drying, and thus causing droplets of the liquid spray to be attached to the surfaces of the granules.

(2) Description of the Prior Art

The necessity of coating or enlarging particles by depositing a material on the surfaces thereof is great in various fields of industry. If the amount of particles to be treated is small, they can readily be coated or enlarged without posing any economic or technical problem.

One process for coating or enlarging particles by depositing a material on the surfaces thereof is disclosed in U.S. Pat. No. 3,231,413. As will hereinafter be described with reference to FIG. 1, this process involves the use of a spouted bed granulator in which priming granules of a particulate material are introduced into a gas stream and caused to encounter, for a very short period of time, with a spray of liquid that is adherent and solidifiable by cooling or drying, and this treatment cycle is repeated until a build-up of desired thickness is obtained on the surfaces of the granules. Specifically, this process causes droplets of the liquid spray to collide with and adhere to the granules being suspended in and conveyed by the gas stream for a very short period of time. However, it will be unsatisfactory if the granules are introduced into the gas stream only once (that is, if it is only once that the individual granules enter the spouted bed where they can encounter with droplets of the liquid spray). The larger the particle diameter becomes, and the greater the amount of liquid to be deposited becomes, the more times the granules must enter the spouted bed.

Figure 1:
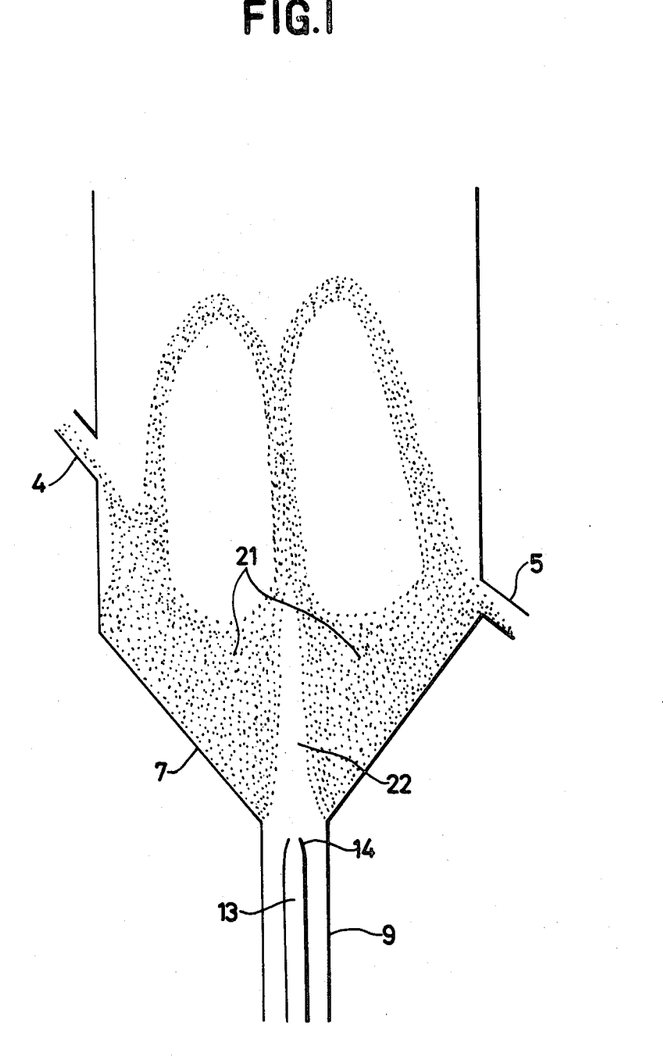
FIG. 1 is a schematic view illustrating a spray bed granulation zone.

Referring now to FIG. 1, a spouted bed 22 is formed at the center of a bed 21 of accumulated priming granules (hereinafter referred to simply as a granular bed), extending upward through the granular bed 21. The surrounding annulus of this spouted bed 22 is constituted of the granular bed 21. Preferably, the granules existing at the lower end of the surrounding annulus are smoothly introduced into the spouted bed 22. Thereafter, they are conveyed upward by the gas stream and then allowed to fall on the upper surface of the granular bed 21. Since the entrance of granules into the spouted bed 22 continues to take place at the lower end of the granular bed 21, the granules which have fallen on the upper surface of the granular bed 21 descend gradually through the granular bed 21 and enter the spouted bed 22 again. As described above, the entrance of each granule into the spouted bed 22 must be repeated many times. Moreover, all the granules of the granular bed 21 must be as uniform in number of entrances as possible.

In order that the above-described process of descent through the granular bed 21 and entrance into the spouted bed 22 may be carried on regularly and smoothly, the granular bed 21 is placed in an enclosure 7 having a bottom section of inverted frustoconical or similar shape. The spouted bed 22 is then formed by the action of a gas stream injected from below into the center of the bottom section of the enclosure 7 along its vertical axis. In order to form a stable spouted bed through the granular bed 21, the pressure of the gas stream injected into the bottom portion of the granular bed 21 must be elevated as the depth of the granular bed 21 increases. Accordingly, if the granulating capability of a granulator of the type in which priming granules are enlarged by placing a granular bed in an enclosure having a bottom section of inverted frustoconical shape and forming a spouted bed at the center thereof is enhanced by increasing the depth of the granular bed, the pressure of the gas stream to be injected and hence the amount of energy consumption may be increased to an undue extent. On the other hand, if the granulating capability of a granulator as illustrated in FIG. 1 is enhanced by increasing the diameter of the enclosure 7, the priming granules to be enlarged tend to lack uniformity in the number of entrances into the spouted bed and, therefore, the particle size distribution of the enlarged granules may be widened. This will increase the formation of granules having larger particle diameters than desired and thereby reduce the efficiency. For these reasons, the only possible measure for the mass production of granules on the principle of spouted bed granulation is to use a plurality of granulators.

SUMMARY OF THE INVENTION

It is an object of the present invention to provide an improved granulating process in which priming granules of a particulate material are enlarged by depositing an adherent and solidifiable liquid on the surfaces thereof.

It is another object of the present invention to provide an improved granulating process which can treat especially large amounts of priming granules with high efficiency to yield a homogeneous granular product.

It is still another object of the present invention to provide an improved granulating process which permits easy control of operation and thereby brings about a stable state of operation.

It is a further object of the present invention to provide an improved apparatus for carrying out such a granulating process.

These objects of the present invention are accomplished by providing, in a granulating process which comprises feeding priming granules of a particulate material to a spouted bed granulation zone and spraying an adherent and silidifiable liquid, together with a gas stream, into said spouted bed granulation zone to form a spouted bed of said priming granules where said priming granules are enlarged by depositing said adherent and solidifiable liquid on the surfaces thereof, the improvement comprising the steps of providing a plurality of spouted bed granulation zones arranged in series and one or more fluidizing and cooling zones fo cooling and drying purposes each disposed between two adjacent ones of said spouted bed granulation zones; introducing said priming granules into the spouted bed granulation zone located at the first stage; passing said priming granules through said spouted bed granulation zones and said fluidizing and cooling zones successively, whereby said adherent and solidifiable liquid sprayed into each of said spouted bed granulation zones becomes attached to said priming granules and said priming granules having said adherent and solidifiable liquid attached thereto are fluidized with a gas stream in the succeeding fluidizing and cooling zone and thereby cooled and/or dried; and withdrawing the enlarged granules from the spouted bed granulation zone located at the last stage.

DETAILED DESCRIPTION OF THE INVENTION

The process and apparatus of the present invention will be more fully described with reference to the accompanying drawings.

Figure 3:
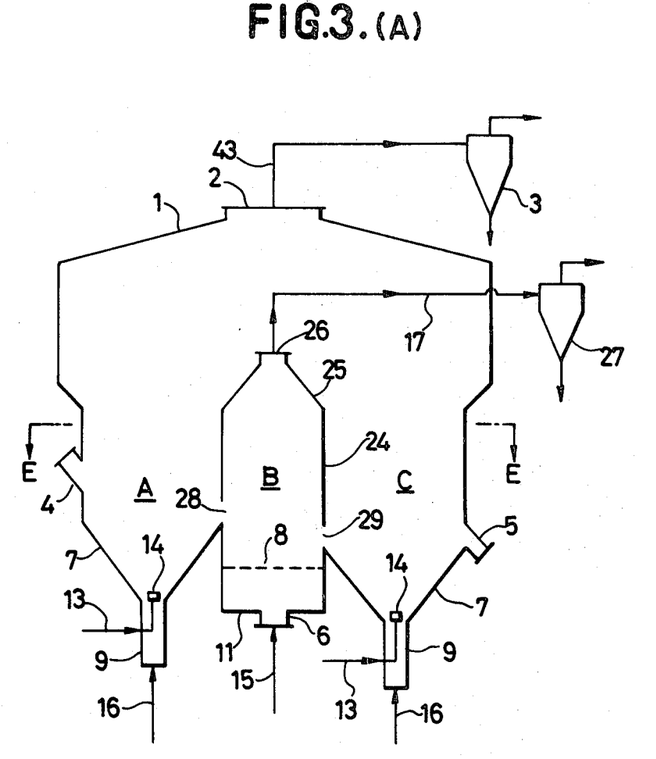
FIG. 3 is a schematic view illustrating one embodiment of the apparatus of the present invention in which the last stage comprises a spouted bed granulation zone alone.

Referring now to FIG. 3, there is illustrated the simplest apparatus that is suitable for carrying out the process of the present invention. This apparatus comprises two spouted bed granulators (hereinafter referred to simply as granulators) and one fluidizing and cooling dryer for cooling and drying purposes (hereinafter referred to simply as a cooler). In FIG. 3, the enclosure 1 of the apparatus is broadly divided into a first-stage granulator space A, a cooler space B and a second-stage granulator space C. An exhaust gas outlet 2 common to both granulators is provided at the top of the enclosure 1 and may be connected, by means of a pipeline, to a separator 3 for collecting the fine solid particles entrained by the exhaust gas. The outer side wall of the first-stage granulator space A is provided with a priming granule inlet 4 and that of the second-stage granulator space B is provided with an enlarged granule outlet 5. The lower part of the enclosure 1 is constituted of two inverted frustoconical granulator bottom sections 7 and a cylindrical cooler bottom section 11 which lies therebetween and includes a perforated plate 8. A gas feed pipe 9 for feeding a gas stream to form a spouted bed is provided at the lower end of each granulator bottom section 7 and a nozzle 14 for spraying an adherent and solidifiable liquid (hereinafter referred to simply as a liquid) is positioned coaxially within the gas feed pipe 9, while a feed gas inlet 6 is provided at the lower end of the cooler bottom section 11. The cooler space B extending above the perforated plate 8 is divided, by an inner side wall 24 and an inner top wall 25, from the inner space of the enclosure 1 which is common to both granulators. The side wall 24 of the cooler space B has an opening 28 for introducing granules into the cooler space B and an opening 29 for discharging granules into the succeeding granulator. In the upper side wall or top wall of the cooler space B is provided an exhaust gas outlet 26 for the gas stream which has been fed through the feed gas inlet 6 of the cooler bottom section 11 for fluidizing purposes, has passed through the perforated plate 8, and has arrived in the cooler space B. This exhaust gas outlet 26 may be connected, by means of a pipeline 17, to a separator 27 for collecting the fine solid particles entrained by the exhaust gas. The principle of granulators is the same as has already been described with reference to FIG. 1. In FIGS. 1 and 3, like reference numerals designate like elements.

In operation, a desired amount of priming granules having a desired particle size distribution is introduced into this apparatus by way of the priming granule inlet 4. In the first-stage granulator space A, the priming granules are enlarged on the above-described principle by spraying a liquid (which is fed under pressure through a pipeline 13) thereinto by the nozzle 14 while injecting a gas stream thereinto through the gas feed pipe 9. Because of the difference in height between the surfaces of the beds present in the spaces A and B, the granules having undergone the enlarging action in the first-stage granulator space A flow through the opening 28 into the cooler space B under the influence of gravity. After having undergone the cooling action of a gas stream in the cooler space B, the enlarged granules flow through the opening 29 into the second-stage granulator space C, where the liquid sprayed by the nozzle 14 and the gas stream injected through the gas feed pipe 9 cause them to undergo an additional enlarging action similar to that exerted in the first-stage granulator space A. The resulting enlarged granules are then withdrawn through the enlarged granule outlet 5 and transferred to a subsequent step.

The granulator used in the present invention will now be described in more detail. To begin with, the factors which determine the granulating capability of this granulator are discussed. As has already been explained with reference to FIG. 1, the principle of the granulator is such that a hot liquid sprayed usually by a nozzle 14, together with a gas stream injected through a gas inlet pipe 9, is introduced into the granulator, the granules existing in the granulator and forming a granular bed 21 are drawn into the resulting spouted bed 22 and thereby put in motion, and enlargement of each granule is effected by causing droplets of the liquid spray to be attached thereto and solidified thereon. Accordingly, the temperature of the granules forming the granular bed 21 must be maintained below the melting point thereof, so that a cooling function is needed. In this granulator, the cooling function is provided by the gas stream injected through the gas inlet pipe 9 and the priming granules introduced through the priming granule inlet 4, both of which are fed at a temperature lower than that of the granular bed 21. Between them, however, the gas stream cannot perform a sufficient cooling function for the following two reasons: First, since this gas stream serves to form a spouted bed, it does not come into close contact with granules of the granular bed 21. Secondly, the feed rate of the gas stream has an upper limit because an excessively high feed rate undesirably causes a considerable portion of the granules of the granular bed 21 to be entrained and carried out of the granulator. Thus, it is necessary for the priming granules to perform a substantial part of the cooling function. That is, the amount of priming granules fed to the granulator has an important bearing on the granulating capability of the granulator. With a granulator having a given shape and size, increasing the amount of priming granules permits the amount of sprayed liquid to be increased, thus improving the granulating capability.

Next, the relationship between the particle size distributions of the priming granules introduced through the inlet 4 and of the enlarged granules withdrawn through the outlet 5 is considered. In addition to the priming granules introduced through the inlet 4, endogenous priming granules are produced, for example, from those droplets of the liquid spray which are cooled and solidified without adhering to priming granules and from those granules of the granular bed 21 which are broken or worn out during their movement. Moreover, since a spouted bed 22 is formed in the granulator, these priming granules undergo an enlarging action to varying degrees. Thus, the granular bed 22 includes granules having a variety of particle diameters, so that the particle diameter range of the enlarged granules withdrawn through the outlet 5 is significantly wider than that of the priming granules introduced through the inlet 4. This widening tendency of the particle size distribution becomes more marked as the residence time of priming granules in the granulator is prolonged, that is, as the ratio of the amount of priming granules introduced into the granulator to that of granules present in the granular bed 21 is decreased.

The advantages offered by the granulating process and apparatus of the present invention will now be described in the following: First, the granulating capability of each granulator becomes greater than in the case of parallel arrangement, thus making it possible to reduce the number of granulators required. When granulation is carried out by using a plurality of granulators of the same shape and size and operating them under the same conditions, the priming granules must be divided into portions and fed separately to the granulators in the case of parallel arrangement, whereas this requirement can be eliminated in the case of series arrangement. Moreover, since the granules enlarged at each stage are cooled and then fed as priming granules to the succeeding stage in the case of series arrangement, the amount of sprayed liquid for each granulator can be increased for the above-described reason. Accordingly, it is possible to reduce the number of granulators required to enlarge the priming granules to a given particle size. For example, in order to achieve the same granulating capability as shown by a plurality of granulators arranged in parallel, the number of granulators arranged in series according to the present invention may be ½ or ⅔ that of granulators arranged in parallel.

Secondly, since the present invention makes it possible, as described above, to reduce the number of granulators required to achieve a given granulating capability as compared with that of granulators arranged in parallel, the widening tendency of the particle size distribution of the enlarged granules obtained as a final product is less marked than in the case of parallel arrangement. Moreover, the apparatus of the present invention includes a cooler disposed next to each granulator, those priming granules which are transferred to the cooler without undergoing a sufficient degree of enlargement in the granulator can be removed by causing them to be entrained by the gas stream for cooling purposes. As a result, the liquid sprayed into the succeeding granulator is deposited on only those granules which have been enlarged to at least a predetermined degree, whereby the widening tendency of the particle size distribution of the enlarged granules can further be decreased. Accordingly, the particle size distribution of the enlarged granules obtained from the last stage is narrower than in the case of parallel arrangement, so that the content of granules having particle diameters within a desired range is increased to enhance the overall efficiency of the granulating apparatus.

Thirdly, in spite of the presence of coolers each disposed between two adjacent granulators, the total amount of gas required for cooling purposes shows no appreciable increase as compared with the case of parallel arrangement. The reason for this is that, since the total amount of gas required for cooling purposes is generally determined by the amount and temperature of the liquid spray which constitutes the only source of heat supply, it remains constant so long as the temperatures of the gas stream at its inlet and outlet are not changed.

Figure 4:
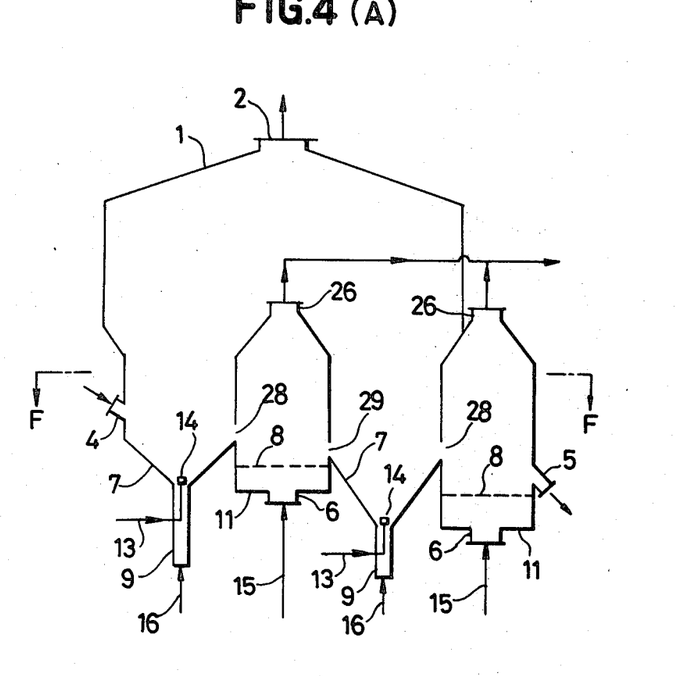
FIG. 4 is a schematic view illustrating another embodiment of the apparatus of the present invention in which the last stage includes an additional fluidizing and cooling zone.

Fourthly, owing to the use of an apparatus comprising granulators and coolers integrated into one unit as illustrated in FIG. 3 or 4, the production of extra fine solid particles can be prevented, which makes it possible to avoid any difficulty arising therefrom. The reason for this is that such an apparatus includes no means for conveying granules from a granulator to the succeeding cooler or from a cooler to the succeeding granulator and, therefore, the inevitable production of extra fine solid particles during conveyance by this means can be avoided. Moreover, this makes it possible to greatly reduce the material cost and labor required for the fabrication of the apparatus. Furthermore, the pipelines for conducting the exhaust gases of granulators and the separators for collecting the entrained fine solid particles therefrom can be omitted by forming the upper spaces of granulator into one common space. Finally, the apparatus of the present invention can save the need of relatively expensive equipment for the divided feed of priming granules and thereby reduce the initial investment significantly.

In the practice of the present invention, the last stage may either comprise a granulator alone or include an additional cooler. In the apparatus for carrying out the process of the present invention, it is necessary to provide a cooler between two adjacent granulators in order that the granules being enlarged in the granulator located at the later stage may be prevented from overheating and thereby fusing together. However, the case is slightly different with the last stage. Specifically, the enlarged granules withdrawn from the last-stage granulator are usually classified into a fraction having particle diameters within a desired range, a fraction having larger particle diameters, and a fraction having smaller particle diameters. The fraction having particle diameters within a desired range, which constitutes a product, is transferred to a subsequent step. The fraction having larger particle diameters is either pulverized and fed as a priming charge to the first-stage granulator, or melted to form an adherent and solidifiable liquid to be sprayed. The fraction having smaller particle diameters is recycled as a priming charge to the first-stage granulator and subjected to enlargement. Thus, depending on the type of after-treatment employed, it is not always necessary to cool all of the enlarged granules withdrawn from the last-stage granulator. For example, if the fraction having larger particle diameters than those of the product is to be melted to form an adherent and solidifiable liquid, and the fraction (or product) having particle diameters within a desired range is to be subjected to a subsequent treatment while remaining hot, these fractions need not be cooled. In such a case, what need be cooled is only the fraction having smaller particle diameters than those of the product because it is directly recycled as a priming charge to the first-stage granulator. In these instances, the last stage of the apparatus of the present invention comprises a granulator alone. On the other hand, owing to the aforesaid classifying operation, the enlarged granules may have to be cooled so as to improve their mechanical strength. Moreover, if the fraction (or product) having particle diameters within a desired range is to be cooled and then transferred to a subsequent step and the fraction having larger particle diameters than those of the product is to be pulverized and then recycled, together with the fraction having smaller particle diameters than those of the product, as a priming charge to the first-stage granulator, it is necessary to cool all of the enlarged granules withdrawn from the last-stage granulator. In this instance, the last stage of the apparatus of the present invention includes an additional cooler.

As stated before, the enlarged granules being cooled in each cooler increase in amount and average particle diameter as the stage advances. Accordingly, the feed rate of the gas stream injected into each cooler is generally increased with advancing stage, though it depends on the desired degree of cooling. As a result, the particle size distribution, average particle diameter and amount of the entrained fine solid particles present in the exhaust gas of each cooler also vary with the stage. Thus, although it is possible to combine the exhaust gases discharged from the coolers, collect the entrained fine solid particles from the combined exhaust gas, and feed them collectively as priming granules to the first-stage granulator or dividedly as additional priming granules to a plurality of granulators, or use them as a source of the adherent and solidifiable liquid, it is most preferable from a technical point of view to collect the entrained fine solid particles separately from the exhaust gas of each cooler and feed these fine solid particles as additional priming granules to any desired granulator or granulators located before the cooler which gave birth to them. This mode of utilization of fine solid particles serves to improve the overall granulating efficiency of the apparatus.

However, when the granulating system employing the process of the present invention is considered as a whole, it may be desirable to combine the exhaust gas of each cooler with the exhaust gas discharged from the common upper space of the granulators, collect the entrained fine solid particles from the combined exhaust gas, and then feed them as priming granules to the first-stage granulator for the purpose of controlling the particle size distribution of the priming granules fed to the first-stage granulator, or use them as a source of the adherent and solidifiable liquid. In this case, the top wall 25 of each cooler space is unnecessary, so that the exhaust gases of all the coolers are combined with those of the granulators in the common upper space of the apparatus and the combined exhaust gas is collectively discharged through the exhaust gas outlet 2. Thus, not only further savings in structural material and piping can be achieved, but also the necessity of controlling the pressure difference between a cooler space and a granulator space adjoining it as will be described later can be eliminated.

In the practice of the present invention, the amount of priming granules or enlarged granules fed to each granulator or cooler becomes greater as the stage advances. In order to allow the effects of the present invention to be exhibited to a full degree, therefore, it is most preferable to operate each granulator in such a way that, according to the amount and temperature of the priming granules fed thereto, the amounts of liquid spray and gas stream fed thereto increase gradually as the stage advances and to operate each cooler in such a way that the gas stream fed thereto increases gradually as the stage advances.

In the practice of the present invention, it is desirable that the pressure difference between a granulator and the succeeding cooler or between a cooler and the succeeding granulator should be as small as possible. If this pressure difference is large, a high-velocity gas stream flowing from the higher-pressure to the lower-pressure side is produced through the opening serving as a passage for the enlarged granules to be transferred (for example, as illustrated in FIG. 4, the opening 28 through which the enlarged granules are transferred from the first-stage granulator to the cooler or the opening 29 through which the enlarged granules are transferred from the cooler to the second-stage granulator), thus preventing the enlarged granules from being smoothly transferred to the succeeding cooler or granulator through the aforesaid opening. Accordingly, it is desirable to adjust the flow rate of the gas stream fed to each granulator or cooler or the flow rate of the exhaust gas discharged from the common upper space of the granulators or the upper space of each cooler so that the aforesaid pressure difference will be not greater than 10 millimeters of water.

The granulating process of the present invention is applicable to both the case in which the priming granules consist of the same material as the adherent and solidifiable liquid or the solute thereof and the case in which the priming granules consist of a material different from the adherent and solidifiable liquid or the solute thereof. In general, the present invention can preferably be applied to the granulation of fertilizer materials. Especially in the manufacture of large amounts of granular products such as urea, ammonium nitrate, complex fertilizers, etc., the granulation can be efficiently carried out by using an apparatus of reduced size.

The priming granules which are used in the practice of the present invention may consist of various particulate materials including urea, ammonium nitrate, ammonium chloride and other salts useful as fertilizers. It is preferable that such particulate materials generally have particle diameters of 0.1 to 4 mm.

The adherent and solidifiable liquid which is used in the practice of the present invention can be a member selected from the group consisting of melts, hot concentrated solutions (in particular, hot concentrated aqueous solutions) and slurries of various solid substances. This adherent and solidifiable liquid may contain 0 to 40% by weight of water, and the temperature thereof is generally in the range of 80° to 170° C.

The weight ratio of the amount of priming granules fed to the granulators to that of adherent and solidifiable liquid sprayed thereinto may preferably range from 1:2 to 1:0.2. The velocity of the gas stream injected into the granulators from around the spray nozzle for the adherent and solidifiable liquid is made sufficiently high about the periphery of the spray nozzle. This gas stream desirably has an average velocity of 0.5 to 2.5 m/sec in the common upper space of the granulators.

The gas stream flowing upward through each cooler desirably has an average velocity of 1.0 to 3.0 m/sec in the upper space of the cooler.

The gas stream which is used in the practice of the present invention generally consists of air. Depending on the type of the adherent and solidifiable liquid, however, inert gases such as nitrogen, carbon dioxide, etc. may be used to prevent deterioration of the granules being enlarged.

In view of the particle size distribution, strength, etc. of the enlarged granules, the rate of particle size enlargement in each granulator is preferably determined so that the particle diameters of the enlarged granules discharged from the granulator are once to three times those of the priming granules introduced thereinto.

As stated before, the apparatus of the present invention is a granulating apparatus of the series arranged type in which a plurality of granulators and coolers are integrated into one unit, so that a granulator and a cooler adjoining it have a partition wall for common use and, therefore, the material cost required for the fabrication of this apparatus can be greatly reduced as compared with that required for the separate fabrication of its component units. However, if it is desired to accomplish the massproduction of granules on a larger scale, a plurality of granulating apparatus of the series arranged type according to the present invention may be arranged in parallel and integrated into one unit. The resulting apparatus has additional partition walls for common use, so that the material cost required for the fabrication thereof can further be reduced.

In the apparatus for carrying out the process of the present invention, the space (such as A or C) extending above the upper end of the inverted frustoconical bottom section of each granulator and the space (such as B) extending below the lower end of the frustoconical top section of each cooler can have any desired horizontal sectional shape such as circular, square, rectangular or the like, irrespective of the stage of the granulator or cooler. However, in order that the material cost may be reduced as much as possible and the functions of the granulators and coolers may be performed to a full degree, it is most desirable to employ a square horizontal section for the upper space of each granulator and a square or rectangular horizontal section for the upper space of each cooler. Moreover, in order to prevent a part of the granules being fluidized over the perforated plate of each cooler from staying there for an unnecessarily long period of time, it is important that all the granules should be smoothly transferred to the succeeding granulator by equipping the perforated plate with a suitable guide member or the like.

In the practice of the present invention, no particular limitation is placed on the numbers of granulators and coolers arranged in series to form a complete succession. In typical cases, however, the mass production of granules having desired particle diameters can satisfactorily be accomplished by using 2 to 6 granulators and 1 to 6 coolers.

To further illustrate the present invention, and not by way of limitation, the following examples are given.

EXAMPLE 1

Figure 5:
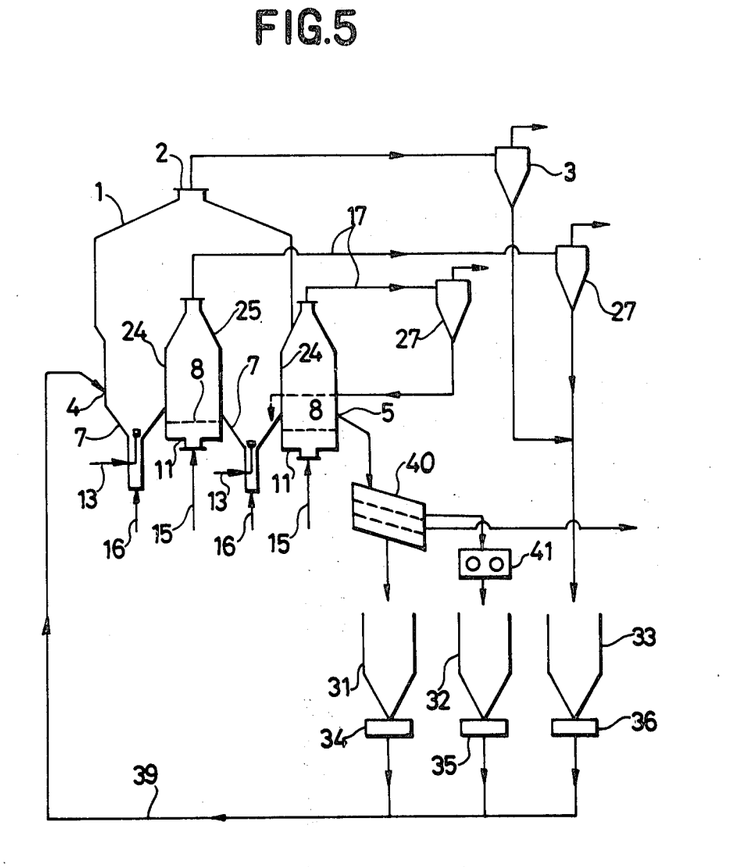
FIG. 5 is a schematic view illustrating a complete granulating system in which the apparatus of FIG. 4 is incorporated.

In this example, granular urea having particle diameters of 2 to 4 mm was produced by using an apparatus of the type illustrated in FIG. 4. This apparatus comprised a first-stage granulator, a first-stage cooler, a second-stage granulator and a second-stage cooler, which were arranged in series in that order and integrated into one unit. As illustrated in FIG. 5, the enlarged granules withdrawn from the second-stage cooler with which this apparatus terminated were transferred to a screen classifier 40, where they were classified into a product having particle diameters within the desired range, a fraction having smaller particle diameters, and a fraction having larger particle diameters. The product was withdrawn from the system, the fraction having smaller particle diameters than those of the product was directly transferred to a storage bin 31, and the fraction having larger particle diameters than those of the product was pulverized in a grinder 41 and then transferred to a storage bin 32. In addition, the fine solid particles collected from the exhaust gas of the first-stage cooler by means of a separator 27 and those collected from the common exhaust gas of both granulators by means of a separator 3 are combined and then transferred to a storage bin 33. The contents of these storage bins were fed to the priming granule inlet 4 of the first-stage granulator by way of feeders 34, 35 and 36 which could regulate their respective feed rates to control the particle size distribution of the priming granules. The fine solid particles collected from the exhaust gas of the second-stage cooler by means of a separator 27 were totally recycled as additional priming granules to the second-stage granulator through its side wall.

The operating conditions were as follows:

| | |
|---|---|
| First-stage granulator | |
| Stream of air | |
| Feed rate | 3,900 Nm$^3$/hr |
| Temperature | 30° C. |
| Spray of molten urea | |
| Feed rate | 2,000 kg/hr |
| Temperature | 138° C. |
| Water content | 0.5% |
| Priming granules | |
| Particle diameters (urea crystals) | 0.1-2 mm |
| Total feed rate | 2,000-2,400 kg/hr |
| Granular bed in the first-stage granulator | |
| Temperature | 100° C. |
| First-stage cooler | |
| Stream of air | |
| Feed rate | 2,300 Nm$^3$/hr |
| Temperature | 26° C. |
| Enlarged granules leaving the first-stage cooler | |
| Temperature | 80° C. |
| Particle diameters | 0.3-5 mm |
| Second-stage granulator | |
| Stream of air | |
| Feed rate | 3,900 Nm$^3$/hr |
| Temperature | 30° C. |
| Spray of molten urea | |
| Feed rate | 2,000 kg/hr |
| Temperature | 138° C. |
| Water content | 0.5% |
| Additional priming granules | |
| Feed rate | About 20-30 kg/hr |
| Second-stage cooler | |
| Stream of air | |
| Feed rate | 7,600 Nm$^3$/hr |
| Temperature | 26° C. |
| Enlarged granules leaving the second-stage cooler | |
| Temperature | 60° C. |
| Particle diameters | 0.3-6 mm |

The results obtained by this operation were as follows:

| | |
|---|---|
| Product (having particle diameters in the range of 2 to 4 mm) | 3,600–4,000 kg/hr |
| Fraction having larger particle diameters than those of the product | 150–200 kg/hr |
| Fraction having smaller particle diameters than those of the product | 1,500–1,900 kg/hr |

COMPARATIVE EXAMPLE

Figure 2:
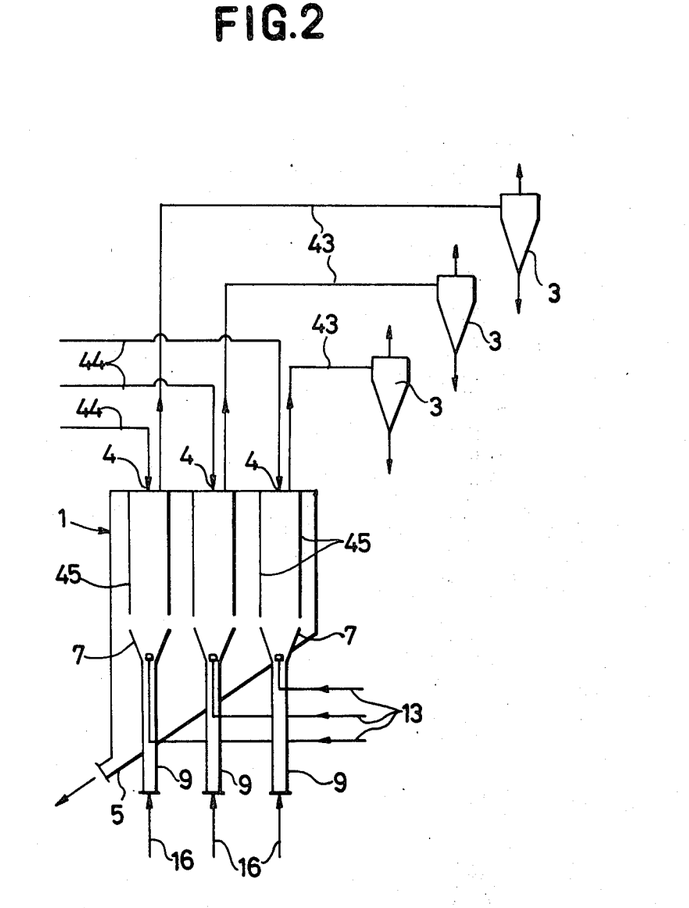
FIG. 2 is a schematic view of a prior art apparatus comprising a plurality of spouted bed granulation zones arranged in parallel.

The apparatus used in this comparative example comprised a plurality of granulators of the type illustrated in FIG. 1, which were provided with an inverted frustoconical bottom section having the same shape and size as that of the granulators used in Example 1, but arranged in parallel (that is, as illustrated in FIG. 2) according to the teachings of Japanese Patent Laid-open No. 99780/'79. Thus, it was found that 3 or 4 granulators were required to obtain the same yield of product.

EXAMPLE 2

Figure 6:
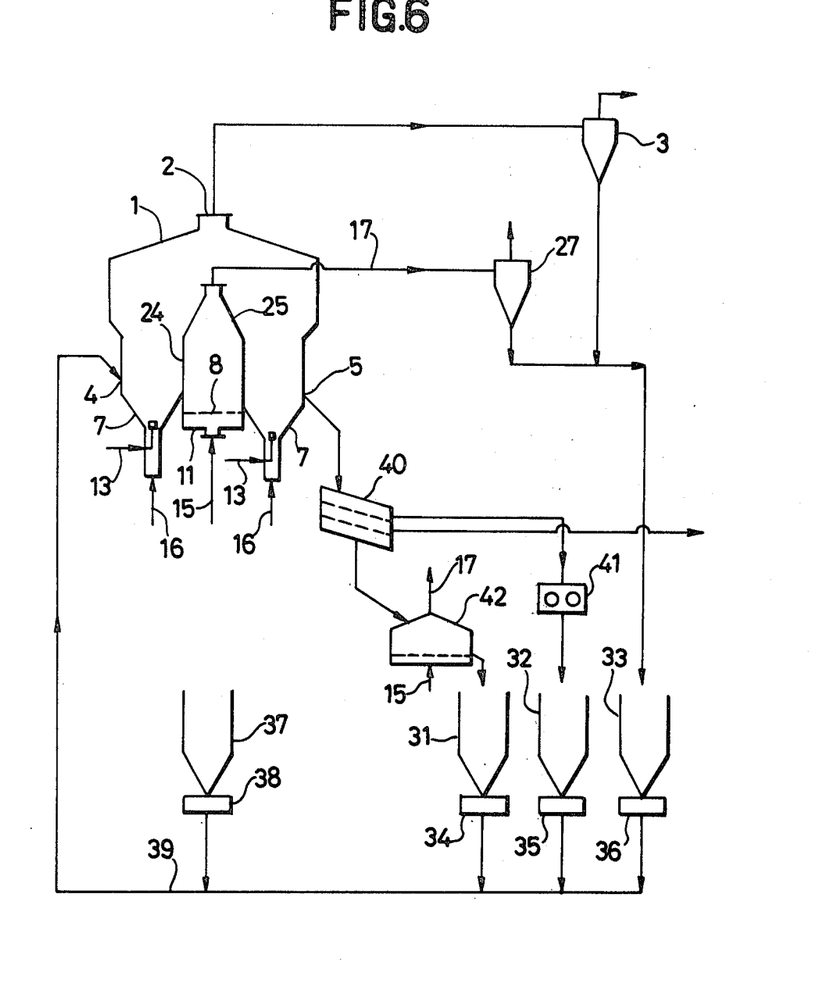
FIG. 6 is a schematic view illustrating a complete granulating system in which the apparatus of FIG. 3 is incorporated.
Figure 7A:
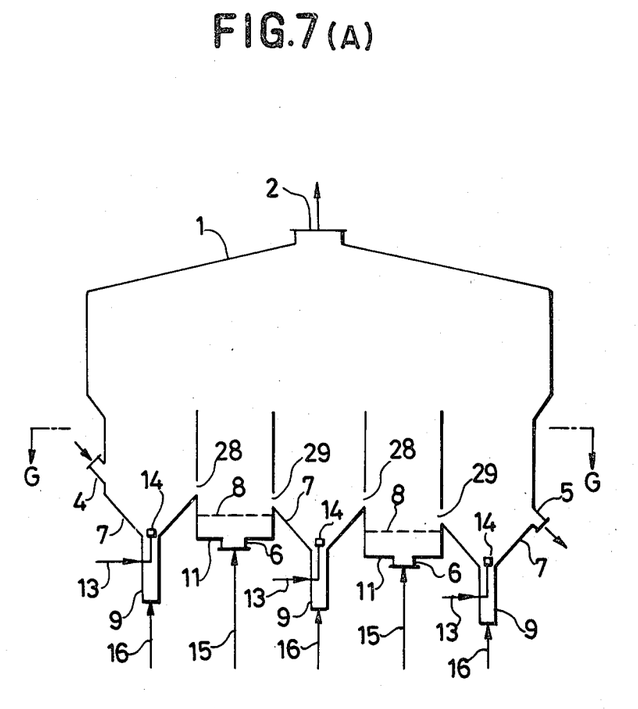
FIG. 7 is a schematic view illustrating a further embodiment of the apparatus of the present invention.
Figure 7B:
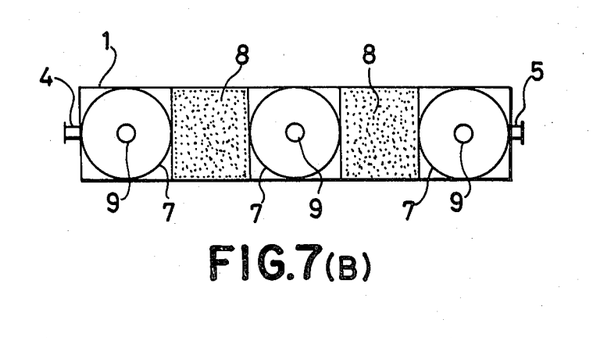

In this example, a granular complex fertilizer containing nitrogenous, phosphatic and potassic ingredients and having particle diameters in the range of 2.5 to 4.5 mm was produced by using an apparatus of the type illustrated in FIG. 3 which was incorporated in the system of FIG. 6. Specifically, a mixture consisting of 1,246 kg of urea, 1,616 kg of ammonium primary phosphate, and 206 kg of water was melted at 105° C. and the resulting melt was sprayed onto potassium chloride particles of 0.3 to 2.5 mm diameter fed as priming granules to the first-stage granulator. The enlarged granules withdrawn from the second-stage cooler with which this apparatus terminated were transferred to a screen classifier 40, where they were classified into a product having particle diameters within the desired range, a fraction having larger particle diameters than those of the product, and a fraction having smaller particle diameters than those of the product. While remaining hot, the product was withdrawn and transferred to a subsequent step. The fraction having smaller particle diameters than those of the product was cooled by means of a separate cooler 42 and then transferred to a storage bin 31. The fraction having larger particle diameters than those of the product was pulverized in a grinder 41 while remaining hot, and then transferred to a storage bin 32. In addition, the fine solid particles included in the exhaust gas leaving the common upper space of both granulators and collected therefrom by means of a separator 3 and those included in the exhaust gas leaving the cooler and collected therefrom by means of a separator 27 were combined and then transferred to a storage bin 33. The contents of these storage bins were fed to the priming granule inlet 4 of the first-stage granulator by way of feeders 34, 35 and 36 which could regulate their respective feed rates to control the particle size distribution of the priming granules. At the same time, the potassium chloride particles placed in a separate storage bin 37 were constantly fed to the priming granule inlet 4 of the first-stage granulator by way of a feeder 38 which could give a constant feed rate.

The operating conditions were as follows:

| | |
|---|---|
| First-stage granulator | |
| *Stream of air* | |
| Feed rate | 3,000 Nm³/hr |
| Temperature | 30° C. |
| *Spray of melt* | |
| Feed rate | 1,718 kg/hr |
| Temperature | 105° C. |
| Water content | 6.7% |
| *Potassium chloride particles* | |
| Feed rate | 1,262 kg/hr |
| *Other priming granules* | |
| Total feed rate | 1,300–1,700 kg/hr |
| *Granular bed in the first-stage granulator* | |
| Temperature | 72° C. |
| *Enlarged granules leaving the first-stage granulator* | |
| Particle diameters | 0.2–5.0 mm |
| Cooler | |
| *Stream of air* | |
| Feed rate | 2,000 Nm³/hr |
| Temperature | 25° C. |
| *Enlarged granules leaving the cooler* | |
| Temperature | 52° C. |
| Second-stage granulator | |
| Feed rate | 3,000 Nm³/hr |
| Temperature | 30° C. |
| *Spray of melt* | |
| Feed rate | 1,350 kg/hr |
| Temperature | 105° C. |
| Water content | 6.7% |
| *Enlarged granules leaving the second-stage granulator* | |
| Particle diameter | 0.2–6.5 mm |

The results obtained by this operation were as follows:

| | |
|---|---|
| Product (having particle diameters in the range of 2.5 to 4.5 mm) | 4,000–4,400 kg/hr |
| Fraction having larger particle diameters than those of the product | 240–280 kg/hr |
| Fraction having smaller particle diameters than those of the product | 900–1,400 kg/hr |

What is claimed is:

1. In a granulating process which comprises feeding priming granules of a particulate material to a spouted bed granulation zone and spraying an adherent and solidifiable liquid, together with a gas stream, into said spouted bed granulation zone to form a spouted bed of said priming granules where said priming granules are enlarged by depositing said adherent and solidifiable liquid on the surfaces thereof, the improvement comprising the steps of providing a plurality of spouted bed granulation zones arranged in series and one or more fluidizing and cooling zones for cooling and drying purposes each disposed between two adjacent ones of said spouted bed granulation zones; introducing said priming granules into the spouted bed granulation zone located at the first stage; passing said priming granules through said spouted bed granulation zones and said fluidizing and cooling zones successively, whereby said adherent and solidifiable liquid sprayed into each of said spouted bed granulation zones becomes attached to said priming granules and said priming granules having said adherent and solidifiable liquid attached thereto are fluidized with a gas stream in the succeeding fluidizing and cooling zone and thereby cooled and/or dried; and withdrawing the enlarged granules from the spouted bed granulation zone located at the last stage.

2. The process according to claim 1 wherein the enlarged granules withdrawn from the spouted bed granulation zone located at the last stage are introduced into an additional fluidizing and cooling zone and thereby cooled and/or dried.

3. The process according to claim 1 wherein the entrained fine solid particles are separated from the exhaust gas leaving each of said fluidizing and cooling zones and recycled as priming granules to said spouted bed granulation zones.

4. The process according to claim 3 wherein said fine solid particles are recycled to the spouted bed granulation zone located at the first stage and/or any spouted bed granulation zones located at intermediate stages.

5. The process according to claim 3 wherein the exhaust gases leaving said fluidizing and cooling zones are combined and the entrained fine solid particles are separated from the combined exhaust gas.

6. The process according to claim 1 wherein the exhaust gases leaving said fluidizing and cooling zones and the exhaust gases leaving said spouted bed granulation zones are combined, and the entrained fine solid particles are separated from the combined exhaust gas and recycled to the spouted bed granulation zone located at the first stage and/or any spouted bed granulation zones located at intermediate stages.

7. The process according to claim 1 wherein the feed rates of said adherent and solidifiable liquid and said gas stream introduced into each of said spouted bed granulation zones as well as the feed rate of said gas stream introduced into each of said fluidizing and cooling zones increase gradually as the stage advances.

8. The process according to claim 1 wherein the pressure difference between a spouted bed granulation zone and a fluidizing and cooling zone adjoining it is not greater than 10 mm of water.

9. The process according to claim 1 wherein said enlarged granules withdrawn from the spouted bed granulation zone or fluidizing and cooling zone located at the last stage are classified into three fractions, the fraction having particle diameters within a desired range is obtained as a product, the fraction having larger particle diameters is pulverized, and both the resulting fine solid particles and the fraction having smaller particle diameters are recyled to said spouted bed granulation zones as priming granules or in the form of an adherent and solidifiable liquid.

10. The process according to claim 1 wherein said enlarged granules withdrawn from the spouted bed granulation zone located at the last stage are classified into three fractions and the fraction having particle diameters within a desired range is cooled and/or dried to obtain a product.

11. The process according to claim 1 wherein the velocity of said gas stream flowing through the upper spaces of said spouted bed granulation zones is in the range of 0.5 to 2.5 m/sec.

12. The process according to claim 1 wherein the velocity of said gas stream flowing through the upper spaces of said fluidizing and cooling zones is in the range of 1.0 to 3.0 m/sec.

13. The process according to claim 1 wherein said priming granules consist of the same material as said adherent and solidifiable liquid or the solute thereof.

14. The process according to claim 13 wherein said priming granules consist of a fertilizer material.

15. The process according to claim 13 wherein said priming granules consist of urea crystals and said adherent and solidifiable liquid is an aqueous solution of urea or molten urea.

16. The process according to claim 13 wherein said priming granules consist of ammonium nitrate and said adherent and solidifiable liquid is an aqueous solution of ammonium nitrate.

17. The process according to claim 1 wherein said priming granules consist of a material different from said adherent and solidifiable liquid or the solute thereof.

18. The process according to claim 17 wherein said priming granules consist of potassium chloride or potassium sulfate and said adherent and solidifiable liquid is a hot concentrated aqueous solution of urea and ammonium primary phosphate.

19. The process according to claim 1 wherein the particle diameters of the granules discharged from each of said spouted bed granulation zones are once to three times those of the granules introduced thereinto.

* * * * *